May 15, 1934.　　　T. J. STURTEVANT　　　1,958,726
AIR SEPARATOR
Filed March 7, 1931　　　2 Sheets-Sheet 1
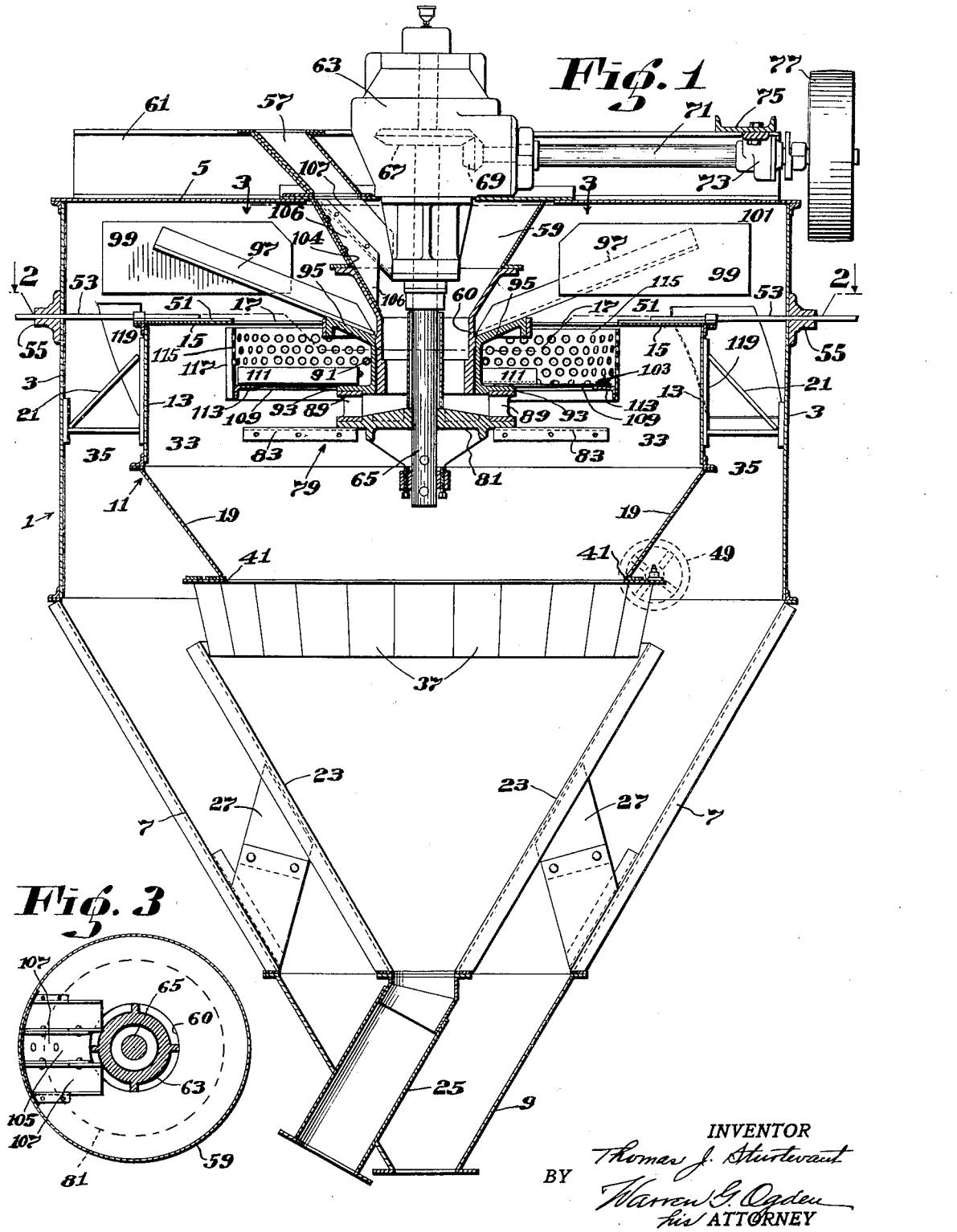

May 15, 1934.　　　T. J. STURTEVANT　　　1,958,726
AIR SEPARATOR
Filed March 7, 1931　　　2 Sheets-Sheet 2
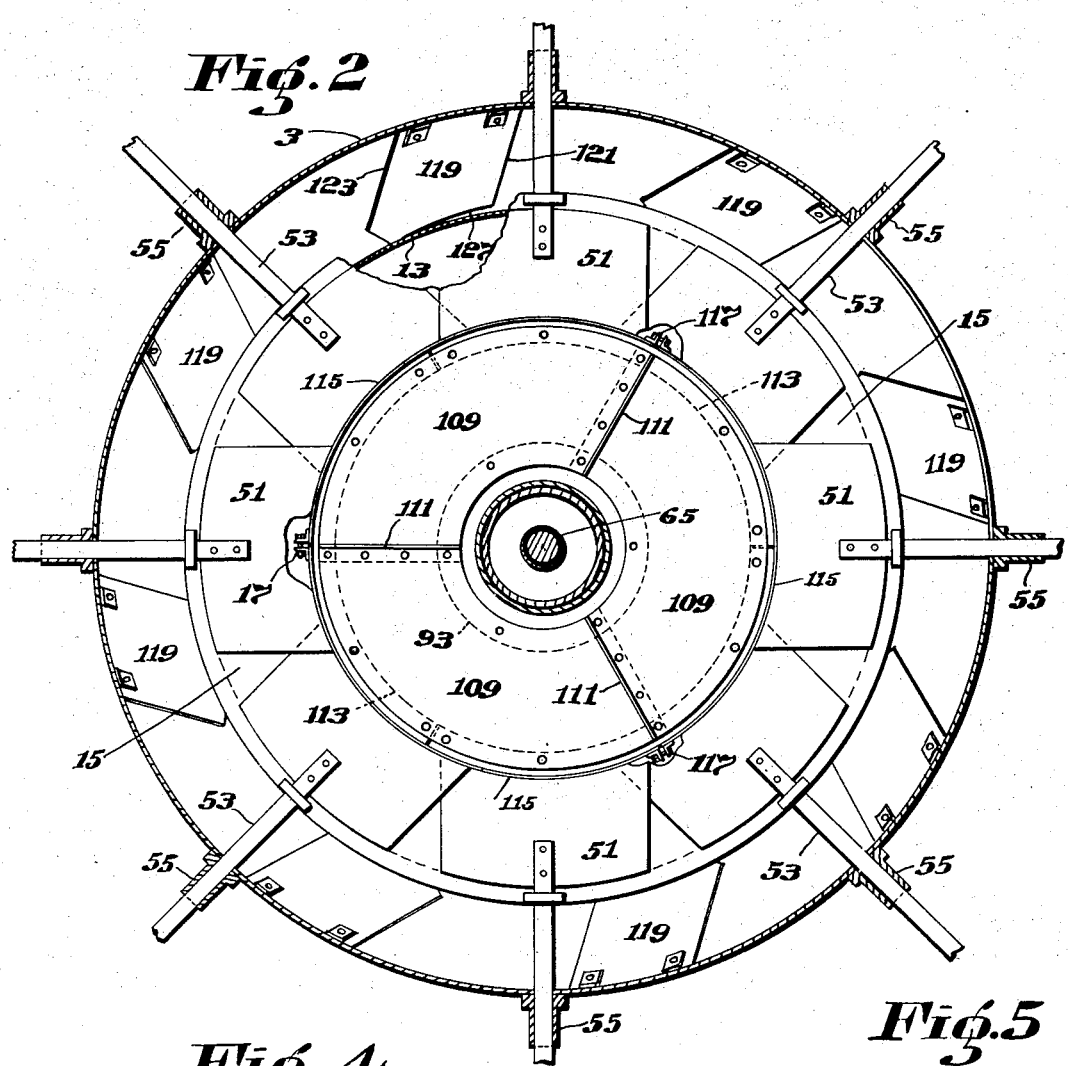
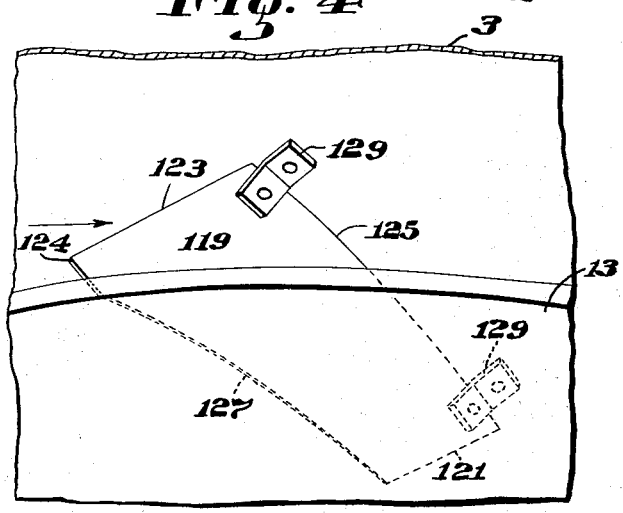
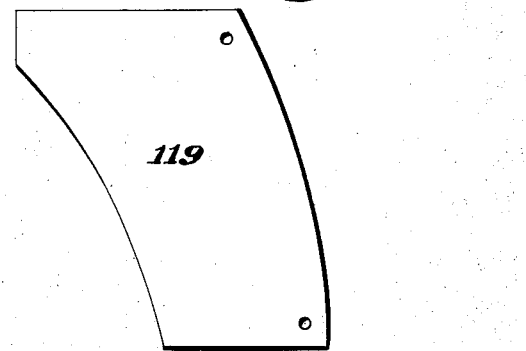
INVENTOR
Thomas J. Sturtevant
BY Warren G. Ogden
his ATTORNEY Patented May 15, 1934

1,958,726

UNITED STATES PATENT OFFICE 1,958,726

AIR SEPARATOR

Thomas J. Sturtevant, Wellesley, Mass., assignor to Sturtevant Mill Company, Boston, Mass., a corporation of Massachusetts Application March 7, 1931, Serial No. 520,886

11 Claims. (Cl. 209—139)

This invention relates to air separators, for grading materials, of the type disclosed in my United States Patent No. 1,615,558 dated January 25, 1927 and in my application for United States patent Serial No. 467,716 filed July 14, 1930.

One object of this invention is to insure a substantially uniform feed to the distributor of the materials to be graded so that the distribution of these materials into the whirling air-currents in the separating chamber also will be uniform and thus increase the efficiency of the separator in the matter of distribution.

Another object of the invention is to reject the undesired particles, which tend to move upward with the whirling air currents in the separating chamber, and prevent their passage over into the settling chamber thus increasing the efficiency of the separator in the matter of selection.

A further object of the invention is to prevent the separated fines, as they pass down through the settling chamber, from being returned back into the separating chamber thus to increase the efficiency of the separator in the recovery of fines.

To the accomplishment of these objects certain novel features of the separator comprise an improved delivery of the stream of materials into the feed hopper and thence to the distributor, a cylindrical deflector applied to the distributor baffle plate which is so shaped and located relatively to the outlet opening as effectively to prevent undesired particles that tend to move with the upward air currents from being passed into the settling chamber, and a plurality of fines-deflector plates within the settling chamber which, in addition to tending to promote the centrifugal force of the air currents in the settling chamber, are so constructed and positioned as to throw the separated fines outward and cause them to tend to pass downward to the discharge spout without being drawn through the inlet opening for the return of the air currents to the separating chamber.

In the accompanying drawings illustrating the preferred form of my invention, Figure 1 is a view, in vertical section, through the complete air separator;

Fig. 2 is a view, in horizontal section, on the line 2—2 of Fig. 1, partly broken away to show a fines-deflector;

Fig. 3 is a view, in horizontal section, of the feed hopper and feed chutes on the line 3—3 of Fig. 1;

Fig. 4 is a view, in perspective, of fragmentary portions of the two walls of the settling chamber with the sperator chamber casing head removed and looking down, from a view-point inside the separator, on one of the fines-deflectors located in the settling chamber; and Fig. 5 is a view, in plan, of one of the fines-deflectors detached from its position in the settling chamber.

Referring to the drawings, the separator shown therein as an illustrative embodiment of the invention, comprises an outer casing 1 consisting of a cylindrical wall 3 having a head 5 at the upper end thereof, and a cone 7 at the lower end thereof terminating in a discharge spout 9. Within and spaced from the outer casing is an inner casing 11 consisting of a cylindrical wall 13 having a head 15 at the upper end thereof with a centralized outlet opening 17 therein, and a conical shell 19 at the lower end thereof. This inner casing is supported by brackets 21 between and secured to the walls 3 and 13.

Beneath and spaced from the conical shell 19 is a cone 23 provided with a discharge spout 25 which extends laterally through an opening in the cone 7 of the outer casing. The cone 23 is supported by plate struts 27 between and secured to it and the cone 7.

The inner casing forms the separating chamber 33, and the annular space between the inner and outer casing walls 3 and 13 forms the settling chamber 35. The space between the conical shell 19 and the cone 23 serves as an inlet opening for the passage of air from the settling chamber back into the separating chamber. Located at this space is a series of adjustable vanes 37 pivotally connected to a ring 41 secured to and projecting outward from the lower edge of the conical shell 19 and adjusted by a hand wheel 49 all substantially as described in my co-pending application Serial No. 467,716 referred to.

To vary the outlet opening 17 in the head of the inner casing, a valve may be provided comprising a series of overlapping plates 51 (Fig. 2) resting upon the head of the inner casing and connected to radial bars or handles 53 which extend outward through brackets 55 secured to the outer casing. These handles may be adjusted exteriorly of the outer casing in order to vary the size of the opening. This valve may be similar to that disclosed in my Patent No. 1,615,558 referred to.

The materials to be graded are conducted into the separating chamber through an inclined delivery chute 57 and through a conical feed hopper 59 depending from the head 5 and having a lower cylindrical neck 60 extending down through the outlet opening in the head 15 of the separating chamber. Mounted on the head of the outer casing are a pair of channels 61 supporting a housing 63 which extends downward through the head 5 into the hopper 59 and has bearings in the upper and lower ends thereof. A vertical driven shaft 65 is journalled in said bearings, and within the portion of the housing above the head 5 has a bevel gear 67 fast thereon meshing with a bevel pinion 69 on a horizontal driving shaft 71 journalled in an inner bearing carried by the housing 63 and in an outer bearing 73 carried by a transverse channel 75 bridging the channels 61. At the outer end of the driving shaft 71 is a pulley 77 which may be driven from any suitable source of power.

The driven shaft 65 extends down from the bearing housing centrally of the feed hopper 59—60, its lower end projecting therefrom into the separating chamber 33. This lower end carries a distributor 79 comprising a plate hub 81 and a plurality of downwardly flanged segmental plates 83, secured to the plate hub and to each other through said flanges, as well known in this type of air separator.

Projecting up from the distributor plate hub 81 are posts 89 carrying a cylindrical hub 91 surrounding the cylindrical neck 60 of the feed hopper and provided with a lower horizontal flange 93 and an upper cone flange 95. Secured to the cone flange 95 are a plurality of oblique arms 97 each carrying a fan blade 99. The fan rotates clockwise in a chamber 101 between the casing heads 5 and 15, its blades preferably overlapping the upper, open end of the settling chamber. Mounted on and secured to the lower flange 93, just above the distributor 79, is a distributor baffle 103 in the form of a circular plate provided with a deflector presently to be described more in detail.

When the shaft 65 is driven the distributor and baffle, 79 and 103, are rotated together with the fan blades 99. The fan will cause air to circulate up through the separating chamber, out through the outlet opening 17 and thence downward through the settling chamber 35 to the inlet opening provided by the vanes 37 and back into the separating chamber. The fan gives the air currents a centrifugal whirling motion in the settling chamber and this whirling motion which extends also throughout the separating chamber is promoted by the adjustable vanes 37.

It is important that the materials to be graded be delivered uniformly and evenly by the distributor to all parts of the separating chamber in order to gain the greatest efficiency of separation by the whirling air currents which immediately act thereon to lift the fines and float them upward through the outlet 17 and then whirl them down through the settling chamber. Heretofore the delivery of the materials to be graded has been of the character illustrated in the separator of my Patent No. 1,615,558. The materials would be delivered, continuously if desired, through the chute 57 and thence in a single stream to the feed hopper 59. The diameter of the feed hopper is determined by the spacing of the channels 61 and the width of the chute 57 is, in practice, about one third thereof. This relatively narrow stream of materials is thrown against the lower part of the housing 63 and while some portion thereof would be projected to the back of the housing the major portion falls downward in front of the housing onto the hub plate 81. Accordingly the materials are piled unevenly on the hub plate and the whirling air currents are unevenly filled with the materials when thrown off of the distributor by centrifugal force.

To correct this fault and provide a substantially uniform distribution of the materials upon the plate hub 81 a special chute or flow controller is provided within the feed hopper 59 just below the delivery chute 57. This flow controller is so formed as to cause the entering stream to divide itself into three parallel tributary streams or branches two of which project themselves to the opposite side of the housing 63 while the third drops downward in front of the housing as before. As illustrated the single stream flowing from the chute 57 is divided into a central delivery of about one third of the width of the discharge edge of the chute and two side deliveries from the remaining or marginal portions of said edge. The central delivery may be merely a flow of material down the lining plate 104 or it may be through a chute 105 (Fig. 3) formed by side walls 106 which extend downward into the feed hopper. The side delivery is preferably through chutes 107 having side walls which prevent discharge except through the lower end which projects into the feed hopper. This form of delivery segregates and directs only about one third of the materials down through the front portion of the feed hopper which heretofore has received substantially the entire stream. The floors of the side chutes may effectively be at the same inclination as the floor of the delivery chute 57, and they extend forward as far as the housing 63 will permit (Fig. 3). Thus substantially two thirds of the material is segregated and directed to flow around the housing to the sides and rear portions of the feed hopper. The discharge of the material is thus divided and controlled so as to deliver in three substantially equal streams through different areas of the feed hopper and thence to the rotating hub plate 61. Consequently the material builds up on the hub plate with a degree of uniformity that materially aids separation of the fines as the material is driven by centrifugal force outward into the whirling air currents within the separating chamber.
When the side walls 106 are used they may be bolted to the inner side walls of the outer chutes 107 (Fig. 1). The upper ends of the chutes 107 may be cut for the desired inclination and flanges (Fig. 3) provided for securing them to the cover 5.

After the materials have been thrown into the separating chamber by the distributor, their direct outward movement being assisted by the baffling effect of the baffle plate 103, it is highly important that the particles to be discarded be carried far outward against the wall 13 so that they will gravitate downward to the discharge spout through the quieter air currents and thus be prevented from carrying over with the fines into the settling chamber. To promote this action the rotating baffle 103 is provided with a deflector in the form of a foraminous shell functioning to bat the heavier particles outward while permitting free passage of the fines to the outlet opening 17.

The distributor baffle 103 comprises a circular plate formed conveniently of three overlapped segmental sections 109 (Fig. 2) each of which has one radial edge 111 upturned and all are bolted to the lower flange 93 of the distributor hub 91. Three segmental pieces of angle iron 113 are bolted, angle inward (Fig. 1), at the outer edge of and more conveniently below the distributor cover, their joints breaking joints with the plate sections 109 for strength of construction. The circular angle bar forms a flange on which the deflector may be set. The deflector is desirably comprised of three, curved, perforated plates 115 which together form a cylindrical shell or cage of substantially the diameter of the baffle plate. The meeting edges of the plates 115 are fitted with reversely turned angle irons 117 (Fig. 2) which are somewhat loosely bolted together so that the deflector may be bound on the marginal flange 113 with a frictional fit and be adjusted vertically thereon. The depth of the shell, or height of the perforated plates 115, is such that the open top of the shell may be set to sweep just beneath the cover plate 15 of the separating chamber. The diameter of the baffle plate is substantially that of the distributor and such that the deflector wall 115 lies at the outer edge of the circular outlet opening 17. The perforations are of substantial size so as not to clog, generally being 1 inch to 1½ inches in diameter in practice but their size depending on the fineness of separation desired. It is not the primary function of this deflector to screen the materials as they are drawn upward by the air currents; its function being to bat the heavier particles as they are whirled against it, and by reason of its own rotation, the centrifugal force acting on the particles and the whirling air currents, to urge or throw these heavier particles outward to the upper corner and against the wall 13 of the separating chamber, keeping them away from the outlet opening 17. The use of this deflector insures that the particles will be more effectively whirled thus increasing the efficiency of the separator in the matter of selection.

To gain efficiency in the recovery of the graded material means is provided for directing the fines outward, as they pass from the fan chamber into the settling chamber, so that their movement downward with the whirling air currents will be mainly against the wall 3 of the settling chamber, as far as possible from the wall of the separating chamber and the inlet opening thereto formed by the vanes 37. Accordingly a plurality of fines-deflectors or guides 119 (Figs. 1 and 2) are set between the walls 3 and 13 at the upper end of the annular settling chamber and just below the swirl of the fan blades 99. The fan and all moving parts rotate in a clockwise direction looking down on the separator and this direction of movement will be called "forward" in describing the position of the deflectors 119. Figs. 2 and 4 show that a deflector is set within the walls of the settling chamber at a compound angle such that the plane of its face is inclined to the horizontal and also inclined to both walls, or at an angle to a vertical plane passed through a radius of the separator. In Fig. 4 the arrow indicates the forward travel of the whirling air currents. The length of the deflector is greater than its width and it is set at a duplex inclination with its lower lateral edge 121 forward of its upper lateral edge 123 and with its outer longitudinal edge 125 forward of its inner longitudinal edge 127. An inclination of 45° in both directions has been found to give excellent results but variation from this angle, within reasonable limits, will not destroy the good effect. The 45° angle is illustrated. It will be observed from Fig. 2 that each upper deflector edge 123 is set at 45° to the vertical plane of that radius of the casing 1 which passes through its inner corner 124 and Fig. 4 shows a 45° inclination to the horizontal. Thus the under face of each deflector slopes downwardly and forwardly longitudinally, and outwardly and forwardly laterally with respect to the forward travel of the whirling air currents. Each deflector may be held in its described position by a pair of angular brackets 129 which connect its outer edge tight against the casing wall 3.

As the fines are whirled downward from the fan chamber 101 into the settling chamber they immediately impinge the under faces of the deflectors 119 and are thereby directed downwardly, forwardly and outwardly until stopped by the outer casing wall 3 down which they then travel until they meet the cone 7, thereby being kept as far as possible from the air inlet to the separating chamber through the centrally located vanes 37. Eight fines-deflectors have been illustrated in Fig. 2 but there may be more or less according to the characteristics of the materials to be graded and the force of the air current determined by adjustment of the inlet vanes 37 and outlet valve plates 51. The general effect is to increase the centrifugal force within the settling chamber.

In the process of grading or separation, the fines build up on all ledges and lodge in all corners in their path. To prevent a gathering or piling up of fines upon the upper faces of the deflectors in the corner formed by the inner longitudinal edge 127 with the inner casing wall 13, each deflector is provided with an opening through which any fines attempting to lodge in this corner may fall or be drawn, and then be whirled onward by the air currents to the under sides of other deflectors. This is illustrated at the top of Fig. 2 where the casing head 15 is shown as broken away. The lower lateral deflector edge 121 may be shortened to an extent that will leave it spaced slightly from the casing wall 13 and the curvature of the inner longitudinal edge 127 will then be eccentric to the curvature of the outer edge and will provide a narrow, open slit through which any fines tending to lodge in this corner may easily be swept by the whirling air currents which fill the settling chamber.

The nature and scope of the present invention having been indicated and its preferred embodiment having been specifically described, what is claimed as new, is:—

1. A air separator comprising concentric, covered separating and settling chambers having inlet and outlet openings between them, means for causing whirling air currents to circulate upward through the separating chamber and downward in the settling chamber, a rotary distributor centrally within the separating chamber for distributing materials into said up-moving air currents, a covered feed hopper above the distributor, a vertical shaft for rotating the distributor journaled in a housing located centrally within the upper portion of the hopper, a side delivery through the cover of the hopper for supplying a main stream of materials to the feed hopper consisting of a single chute of restricted width above the hopper cover, and a flow controller within the hopper consisting of three parallel chutes for receiving said main stream of which the central chute directs one division of the stream downward in front of said housing and the two side chutes direct other divisions of the stream around and to the sides and rear of said housing.

2. An air separator according to claim 1 in which the side delivery consists of an inclined chute outside the hopper and the flow controller consists of two separated chutes within the hopper having substantially the same inclination as said delivery chute, extending downward from the marginal portions of the lower edge of said delivery chute and delivering to each side of said housing, and a third chute within the hopper between said two marginal chutes extending downward at a greater inclination and delivering to the front of said housing.

3. An air separator comprising a covered inner cylindrical casing forming a separating chamber, a covered outer cylindrical casing, said casing walls forming an annular settling chamber and said chambers being connected through a centralized circular outlet opening in the cover of the separating chamber and a peripheral inlet opening at its bottom, a fan for inducing whirling air currents to circulate through said chambers moving up in the separating chamber and down in the settling chamber, a rotary distributor centrally of the separating chamber having a circular baffle plate located below said outlet opening, means for rotating the fan, distributor and its baffle, means for directing the materials to be graded onto the distributor to be thrown into the whirling air currents by centrifugal force, and a cylindrical substantially rigid deflector of foraminous material having at least the diameter of said outlet opening mounted at the outer edge of said baffle plate and having its vertical wall extending between the baffle and the outer edge of said outlet opening to enclose the entire outlet passage whereby the heavier particles are batted outward as they are whirled against said wall and kept away from said outlet opening.

4. An air separator according to claim 3 in which the baffle plate is provided with a vertical flange at its outer edge and the cylindrical deflector is formed of a plurality of curved segments secured together adjustably at their meeting edges and the whole being bound thereby on said wall with a friction fit.

5. In an air separator of the type described having a covered separating chamber with a centralized circular outlet opening in said cover communicating with a settling chamber, means for producing whirling air currents which ascend in the separating chamber, pass through said outlet opening and descend in the settling chamber, a rotary distributor centrally located within the separating chamber having a baffle plate, and a cylindrical shell of perforated sheet material mounted on said baffle plate and extending upward therefrom substantially to the cover of the separating chamber to sweep the underside of said cover at the outer edge of said outlet opening.

6. An air separator comprising a covered inner cylindrical casing forming a separating chamber, a covered outer cylindrical casing, said casing walls forming an annular settling chamber surrounding the separating chamber, means for inducing whirling air currents to move up in the separating chamber, pass through an outlet in its cover and then move down through the settling chamber and circulate into the lower part of the separating chamber, and a plurality of fines-deflector plates set between the casing walls forming the settling chamber at an angle to the horizontal and simultaneously at a second angle to a vertical plane through a radius of the separator.

7. An air separator according to claim 6 in which the air currents are induced by a rotary fan located in a chamber between the covers of said casings and having blades which overlap the upper, open end of the communicating settling chamber, said fines-deflector plates being positioned with their upper edges relatively close to the plane in which the lower edges of said fan blades travel.

8. An air separator according to claim 6 in which each fines-deflector plate has its outer longitudinal edge fitted tight against the outer casing wall and has a portion at least of its inner longitudinal edge spaced from the inner casing wall.

9. In an air separator of the type described having a central separating chamber and a communicating, annular outer settling chamber, a rotary fan for producing whirling air currents which ascend in the separating chamber and descend in the settling chamber, and fines-deflector plates in a spaced series around the annular settling chamber, each plate having a greater length than width and being set between the walls of said chamber with its lower lateral edge forward, as related to the direction of movement of said fan, of its upper lateral edge and its outer longitudinal edge forward, in like manner, of its inner longitudinal edge.

10. In an air separator of the type described having a separating chamber and a communicating annular outer settling chamber, a plurality of fines-deflector plates each set between the walls forming the settling chamber at substantially a 45° angle to the horizontal and each with its upper edge at substantially a 45° angle to the vertical plane of that radius of the separator which passes through the inner corner of said upper edge.

11. In an air separator of the type described having a circular separating chamber and a communicating annular outer settling chamber, a fines-deflector plate adapted to be mounted between the inner convexed and the outer concaved walls of the annular settling chamber and having a convexly curved outer longitudinal edge and a concavely curved inner longitudinal edge the curvature of which is eccentric to the curvature of said outer edge.

THOMAS J. STURTEVANT.